United States Patent [19]

Spaude et al.

[11] 4,077,493

[45] Mar. 7, 1978

[54] GREASE GUN

[75] Inventors: Robin W. Spaude; Alvin L. Bowers, both of Granite Falls, Minn.

[73] Assignee: Parker-Hannifin Corporation, Cleveland, Ohio

[21] Appl. No.: 750,961

[22] Filed: Dec. 15, 1976

[51] Int. Cl.² ............................................. F16N 3/12
[52] U.S. Cl. ................................. 184/105 A; 184/28; 184/38 R; 222/256; 222/326
[58] Field of Search ................ 184/105 A, 105 R, 28, 184/38 R; 417/489; 222/380, 383, 256, 326, 260, 340

[56] References Cited

U.S. PATENT DOCUMENTS

| 2,915,226 | 12/1959 | Sundholm | 222/326 X |
| 2,941,854 | 6/1960 | Jernander | 222/256 UX |
| 2,985,495 | 5/1961 | Neuman | 222/326 X |
| 3,187,959 | 6/1965 | Morehouse | 222/326 X |
| 3,338,478 | 8/1967 | Hedblad | 222/256 X |
| 3,612,359 | 10/1971 | Sundholm | 222/326 X |
| 3,752,367 | 8/1973 | Sundholm | 222/256 |
| 3,780,830 | 12/1973 | Helgerud et al. | 184/38 R X |

FOREIGN PATENT DOCUMENTS

| 182,849 | 3/1963 | Sweden | 184/105 A |

Primary Examiner—David H. Brown
Attorney, Agent, or Firm—Donnelly, Maky, Renner & Otto

[57] ABSTRACT

A grease gun characterized in that a dispensing head assembly having a lever-operated piston pump is screwed onto the head end of a grease-containing cylinder and in that a spring-biased plunger and rod assembly inserted into said cylinder from the head end thereof with a rear end cap engaging an inturned flange at the rear end of said cylinder is operative to feed grease from the cylinder to the pump.

5 Claims, 3 Drawing Figures

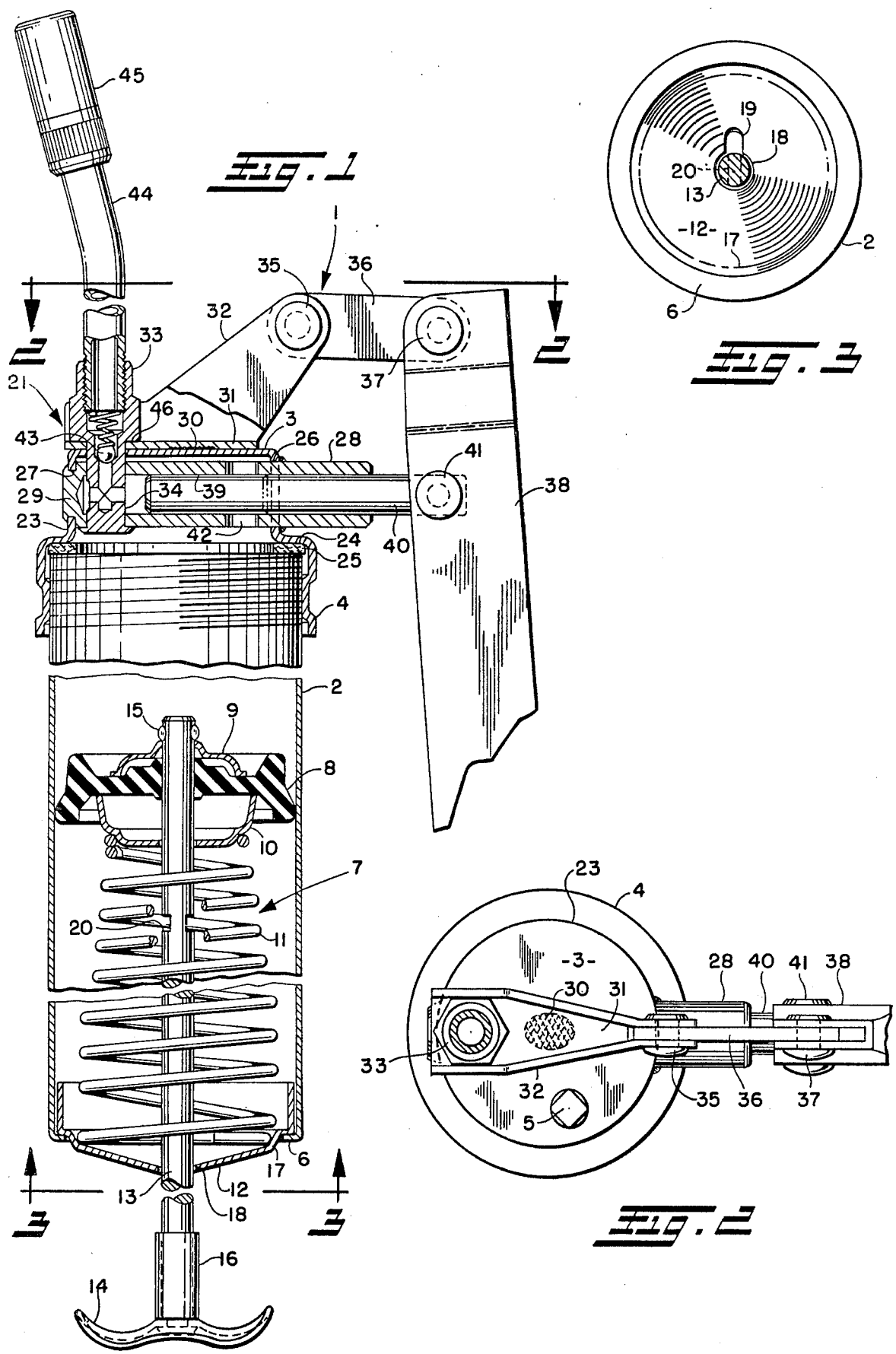

GREASE GUN

BACKGROUND OF THE INVENTION

In known forms of lever-operated grease guns as disclosed for example, in the U.S. Pat. Nos. 2,923,443, 2,941,854, and 3,780,830 it is a prevalent practice to thread both ends of a grease-containing cylinder for screwing thereonto the head end cap of a dispensing head assembly and the rear end cap of spring-biased plunger and rod assembly of which the rod is operative to retract the plunger in the cylinder for filling the same with grease in bulk or cartridge form and of which the plunger is effective to feed grease in the cylinder to the lever-operated pump of the dispensing head assembly.

SUMMARY OF THE INVENTION

In contradistinction to the foregoing known forms of lever-operated grease guns the present invention provides a grease gun which is of simple construction and economical to manufacture in that the rear end of the grease-containing cylinder is merely formed with an inturned flange engaged by the rear end cap of the spring-biased plunger-rod assembly, said assembly being inserted into the cylinder from the head end thereof and the rod operating handle being of size to pass through said inturned flange.

Other objects and advantages will appear from the ensuing description.

BRIEF DESCRIPTION OF THE DRAWING

FIG. 1 is a central longitudinal cross-section view of a lever-operated grease gun according to the present invention;

FIG. 2 is a view taken substantially along the line 2—2, FIG. 1; and

FIG. 3 is a view taken substantially along the line 3—3, FIG. 1.

DETAILED DESCRIPTION OF A PREFERRED EMBODIMENT

Grease gun 1 comprises a cylinder 2 adapted to be filled with grease as by installing a grease pump adapter (not shown) in the filler opening in the upper end wall 3 of a head cap 4 in place of screw plug 5; or by removing the head cap 4 either for insertion of a grease cartridge (not shown) into cylinder 2 or for sucking bulk grease from a pail into cylinder 2 by retracting plunger 8.

The rear end of the cylinder 2 is curled or rolled in to provide an inturned flange 6 and inserted into the cylinder 2 from the head end thereof is a unitary assembly 7 comprising a plunger 8 of elastomeric material in sliding sealed engagement with the interior wall of the cylinder 2, a pair of rings 9 and 10 on opposite sides of the plunger 8, a spring 11, an end cap 12, and a plunger rod 13 having a handle 14. When said assembly 7 is installed from the head end of the cylinder 2, the end cap 12 engages the inturned flange 6 at the rear end of the cylinder 2. The plunger rod 13 may comprise heavy gage wire which has sliding sealed engagement within the center bore of the plunger 7 and has integrally formed wings or projections 15 to retain the ring 9. The handle 14 may be a sheet metal stamping having an opening therethrough for the reduced end of the rod 13 which is staked or headed as shown with a spacer tube 16 between the handle 14 and the rear end cap 12. The ring 10 constitutes a plunger support and provides a seat for the spring 11, and a depression 17 in the rear end cap 12 provides a seat for the other end of the spring 11. The rear end cap 12 has a guide opening 18 for the plunger rod 13 which has a cutout 19 as shown to receive the notched portion 20 of the rod 13 when the latter, together with the plunger 8, is pulled down and tilted thus to retain the plunger 8 in downwardly retracted position.

The dispensing head assembly 21 comprises the head cap 4 which has screw-threaded engagement with the head end of the cylinder 2 and which has a cylindrical extension 23 of reduced diameter to provide a shoulder 24 to receive a gasket 25 to seal the head cap 4-cylinder 2 connection when the head cap 4 is tightly screwed onto the cylinder 2. The reduced diameter extension 23 of the head cap 4 has diametrically opposite holes 26 and 27 therethrough for receiving the pump cylinder 28, the smaller hole 27 receiving the reduced diameter extension 29 at the blind end of the pump cylinder 28 for staking of the cylinder 28 to the head cap 4 as shown. If desired, the portion of the cylinder 28 which extends outwardly beyond the cap 4 may be sealed as by brazing or soldering as shown.

Secured as by welding at 30 to the top wall 3 of the head cap 4 is the base 31 of a clevis 32 which has upstanding portions to embrace opposite flats of the hex of a check valve body 33 which has a stem portion 34 extending through aligned holes in the base 31 of the clevis 32 and in the wall 3, said stem portion 34 being pressfitted into a cross bore adjacent the blind end of the pump cylinder 28. The lower end of the stem portion 34 is staked as shown in FIG. 1 to firmly anchor the check valve body 33 and the pump cylinder 28 to the head cap 4.

The clevis 32 provides a pivot 35 for a link 36 which is pivotally connected at 37 to the end of a piston operating lever 38. Slidably fitted in the pump cylinder bore 39 is a piston 40 which has its outer end pivotally connected at 41 to the lever 38, the pump cylinder 28 having an inlet opening 42 through which grease flows from cylinder 2 into the pump cylinder 28 when the end of the piston 40 uncovers the opening 42.

When there is grease in the cylinder 2 and when the notch 20 has been released from the cutout 19, the plunger rod 13 may be pushed into the cylinder 2 toward the dispensing head assembly 21. The spring 11 which is compressed between the rear end cap 12 and the plunger engaging ring 10 tends to constantly urge the plunger 8 upwardly to exert pressure on the grease to keep the head cap 4 filled with grease. In the event that the plunger 8 sticks in the cylinder 2 (or in the grease-containing cartridge), the rear end cap 12 may be pushed upwardly away from the inturned flange 6 thus to increase the biasing force of the spring 11 to overcome the friction of the sticking plunger 8. When the lever 38 is swung away from the cylinder 2 to cause the piston 40 to move to the phantom line position, grease will enter the pump cylinder bore 39 through inlet 42 whereupon swinging of the lever 38 toward the cylinder 2 will displace the grease trapped in the cylinder bore 39 through the check valve 43 in the check valve body 33, through the dispensing tube 44 which is screwed into the check valve body 33 and through the grease fitting coupling 45 to inject the grease into a grease fitting (not shown).

It is to be noted that in the case of a blocked or frozen grease fitting where it is required to exert high pressure on the grease, the engagement of the shoulder 46 of the check valve body 33 with the base 31 of the clevis 32 will prevent the large forces applied on the clevis pivot 35 by the link 36 from tending to break the clevis 32 away from its welded connection 30 to the end wall 3 of the head cap 4. Likewise, the upstanding portions of the clevis 32 which embrace opposite flats of the check valve body hex prevent turning of the check valve body 33 when the dispensing tube 44 is screwed into or unscrewed from the check valve body 33.

When a grease cartridge (not shown) is inserted into the cylinder 2 (with plunger 8 latched in retracted position), the tapered annular portion of the plunger 8 when unlatched will be resiliently wedged into the cartridge to make sliding sealed engagement with the interior wall thereof thus to apply pressure on the grease for feeding it into the pump cylinder 28 when the inlet opening 42 is uncovered by the piston 40. If the plunger 8 sticks when unlatched it may be re-latched by engagement of notch 20 with cutout 19 whereupon upward movement of the tilted rod 13 will push the rear end cap 12 upwardly away from the inturned flange 6 to increase the biasing force of spring 11 so as to cause the plunger 8 to enter the cartridge for applying pressure on the grease in the cartridge.

A further feature of the present invention is that the end cap 12 has a conical end wall to facilitate draining of paint therefrom during the painting operation. Moreover, when the rod 13 is pulled out and tilted for latching the rod 13 and plunger 8 in retracted position, the interengaged notch 20 and cutout 19 are inclined at about the same angle to resist inadvertent disengagement of the notch 20 from the cutout 19. In addition, when the tilted and latched rod 13 is used to move the rear end cap 12 as previously mentioned, tilting or cocking of the latter in the cylinder 2 is minimized by the skirt of the rear end cap 12 and by the interengaged inclined notch 20 and cutout 19.

The embodiments of the invention in which an exclusive property or privilege is claimed are defined as follows:

1. A grease gun comprising a grease-containing cylinder having means for feeding grease therein toward one end of said cylinder; and a lever-operated piston pump assembly at said one end operative to pump grease fed thereto through a pump outlet passage; said assembly comprising a head cap screwed onto said one end of said grease-containing cylinder; said means for feeding grease comprising a unitary assembly inserted into said cylinder from said one end thereof and including a plunger in sliding sealed engagement within said cylinder; a rear end cap, a spring compressed between said plunger and said end cap, and a plunger operating rod having a head on its axial inner end operative to retract said plunger toward said rear end cap by axial pull on a T-shaped handle at the axially outer end of said rod; said cylinder at said other end having an inturned flange which is engaged by the peripheral portion of said rear end cap whereby said spring is operative to bias said plunger toward said pump assembly to feed grease in said cylinder to said pump assembly; said T-shaped handle being of length to pass through said inturned flange; and said rear end cap being movable axially away from said inturned flange to increase the bias of said spring on said plunger in the event of sticking of the latter.

2. The grease gun of claim 1 wherein said rod and rear end cap having cooperating engageable and disengageable latch means operative when engaged to retain said rod and plunger in retracted position as during filling of said cylinder with grease and operative when disengaged to release said rod for spring-biased movement of said plunger toward said pump assembly; said rear end cap being movable as aforesaid by application of force on said rod when said latch means is engaged.

3. The grease gun of claim 1 wherein said rear end cap has a cylindrical skirt portion guided within said cylinder to minimize tilting or cocking of said rear end cap in said cylinder during installation of said unitary assembly or during movement of said rear end cap as aforesaid.

4. The grease gun of claim 2 wherein said rear end cap has a central guide opening for said rod; and wherein said latch means comprises a transversely notched portion on said rod which, when said rod is retracted and tilted engages a radially extending cutout from said guide opening.

5. The grease gun of claim 4 wherein said rear end cap has a conical end wall through which said guide opening and cutout extend with the cutout being inclined at about the same angle as the notched portion of the tilted rod.

* * * * *